UNITED STATES PATENT OFFICE 2,523,777

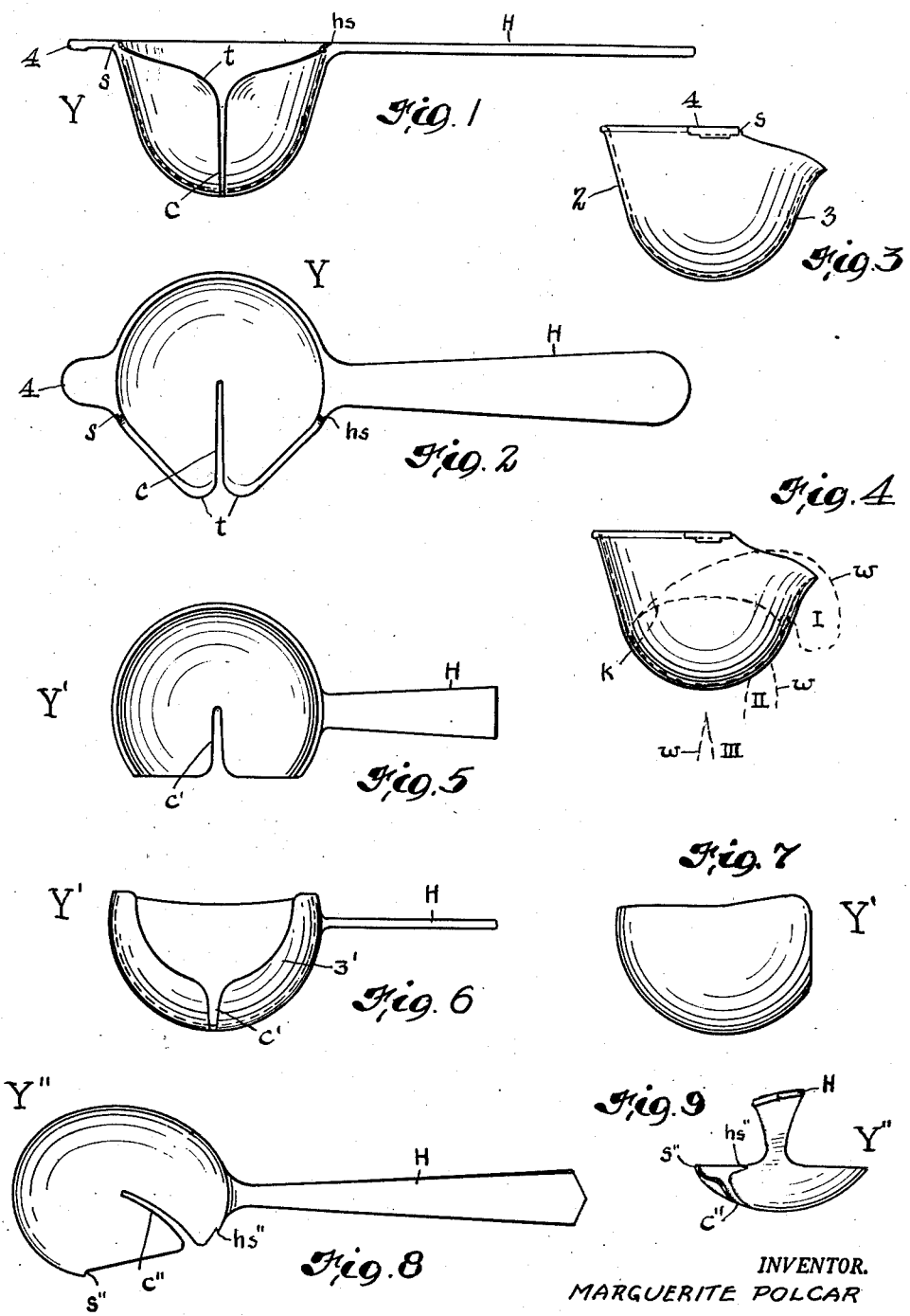

EGG SEPARATOR

Marguerite Polcar, Rome, Ohio

Application December 5, 1946, Serial No. 714,340

9 Claims. (Cl. 146—2)

With the customary implements for separating egg whites or albumen from the yolks, it is often necessary to resort to the auxiliary help of a spoon or knife, particularly with very fresh eggs. This is due to the holding together at the comparatively tough stringy chalaza portion which extends in the albumen from the yolk membrane polar-ward, and the usual design of egg separators take no account of it. In accordance with the present invention, provision is made for this, and the separation becomes quick, accurate, and automatic. And withal, a device is had which is simple in construction and inexpensive to manufacture. Other objects and advantages will appear from the following description.

To the accomplishment of the foregoing and related ends, the invention then, comprises the features hereinafter fully described and particularly pointed out in the claims, the following description and annexed drawing setting forth in detail certain illustrative embodiments of the invention, these being indicative however, of but a few of the various ways in which the principle of the invention may be employed.

In said annexed drawing—

Fig. 1 is a side elevational view of a device in accordance with the present invention;

Fig. 2 is a plan view, and

Fig. 3 is an end elevational view thereof.

Fig. 4 is a diagrammatic end elevational view showing stages in the operation of the device.

Fig. 5 is a plan view of a modification, and

Figs. 6 and 7 are a side elevation and end elevational view, respectively, of the construction shown in Fig. 5; and Figs. 8 and 9 are plan and rear end elevational views, respectively, of another modification.

Referring more particularly to the drawing, the device in general involves a holder for the yolk of an egg after the breaking and emptying from the shell, and associated with the holder are the albumen-separating features of construction. A handle H of size as desired, is of convenience for manipulation or for resting on a receptacle. The holder is of a size to accommodate the yolk. Preferably, as shown in Figs. 1 and 2, the holder Y tapers somewhat to the bottom instead of being a true hemisphere and thus allows yolks of various size to settle in, to the exclusion of the albumen, and preferably the back wall 2, Fig. 2, of the yolk-holder is sloping, while the front wall 3 is steeper. This facilitates rolling and separating movement for the yolk to settle into the holder; and preferably also the edge of the front wall is cut down or inclined as an overflow rim for the albumen. At the handle end of such overflow rim is a stop $hs$, which forms a limit preventing the albumen mass from slipping on around, and at the other end of the overflow rim adjacent the projecting lug 4 is a similar stop $s$. Intersecting the overflow rim is a cut or chalaza-recess $c$. This may extend in to a greater or less degree, even to the center of the bowl of the yolk holder. Generally, the deeper the slot, the greater the efficiency. The rim portion adjacent the slot $c$ is preferably out-turned, and may be also cut down somewhat, such portion being shown at $t$.

In the operation of the device, the egg mass of yolk and enveloping albumen is dropped into the cup-like yolk holder, and the overflowing albumen rolls over the overflow edge, and being confined between the stops is accelerated in separation and downflow over the rim, slipping into the chalaza-recess where the albumen mass is finally restricted to the chalaza portion and the stringy chalaza is drawn against the limiting edge of the recess, and the drag-down weight of the albumen pulls the stringy chalaza to separation at the limit of the chalaza-recess and the albumen mass falls into the collecting receptacle below. These progressive stages of action will be readily visualized by reference to the diagrammatic end-elevation showing of Fig. 4, in which as the yolk $k$ rolls and settles into the bowl the albumen mass $w$ first flows over the rim and starts into the chalaza-recess, as is indicated at position I, then in succession the albumen mass attenuates completely into the chalaza-recess, as is indicated at position II, and finally with the breaking of the slender chalaza the albumen mass falls away as is indicated at position III.

Instead of resting the device stationarily on a receptacle, it may be operated as a scoop or spoon picking up the yolk and albumen which has been deposited in a bowl or receptacle on breaking the shell, and with a dexterous slight tilting back of the holder the yolk rolls and settles into the holder while the albumen mass runs off over the rim and draws down into the chalaza-recess and then breaks loose to fall into a suitable collector receptacle, as afore-described.

In the form shown in Figs. 5, 6 and 7 the yolk-holder Y' has its front wall 3' more cut down as an overflow rim presenting a relatively shallow dam or barrier to retain the yolk, while the albumen overflows and again runs into the chalaza-recess $c'$ for a rapid restriction and cutting off.

Either of the afore-described forms may be used in a scoop or pick-up operation, and if desired the device may be embodied in a form more spoon-like, as for example in Figs. 8 and 9. Here the spoon-bowl Y" is carried by the handle H, and the chalaza-recess c" extends in from the edge. The handle portion adjacent the bowl forms a stop hs" limiting the sliding around of the albumen in one direction and a small stop s" may be provided on the rim beyond the other side of the chalaza-recess. The device in use may be applied as a scoop to lift up an albumen and yolk unit from a receptable and hold the yolk as the albumen runs over the rim and down into the recess and severs to discharge. Also such device may be conveniently used as a stirrer or beater or to pick up and drain vegetables, etc. out of hot liquid, or also to pick up or measure baking powder, flour, etc., as it is found that such materials pack together sufficiently to avoid loss effecting ordinary accuracy.

In all embodiments the construction involves a chalaza-recess intersecting the rim at an angle which may be at ninety degrees or either way therefrom. Preferably the rim at both sides of the recess slants or slopes down thereto.

Other modes of applying the principle of the invention may be employed, change being made as regards the details described, provided the features stated in any of the following claims, or the equivalent of such, be employed.

I therefore particularly point out and distinctly claim as my invention:

1. In a device of the character described, a yolk-holder having a sloping back wall and a steeper front wall, an albumen overflow rim on the front wall, a stop at each end for said overflow rim, a chalaza-recess intersecting said overflow rim, and cut-down out-turned lips at the junction of said rim and recess.

2. In a device of the character described, a yolk support, an albumen overflow rim on the front wall, a stop for each end of said overflow rim, a chalaza-recess intersecting said overflow rim, and cut-down out-turned lips at the junction of said rim and recess.

3. In a device of the character described, a yolk support having a concaved floor, an albumen overflow rim at the front wall thereof, a stop for each end of said overflow rim, and a chalaza-recess intersecting said overflow rim and cutting back through the floor of the support toward its center as a narrow slot whose edges are about parallel.

4. In a device of the character described, a yolk support having a concaved floor, an albumen overflow rim at the front wall thereof, a stop as an upstanding projection at at least one end of said overflow rim and a chalaza-recess intersecting said overflow rim and cutting back through the floor of the support toward its center as a narrow slot whose edges are about parallel.

5. In a device of the character described, a yolk support having a sloping back wall and a steeper front wall, an albumen overflow rim at the front wall, a chalaza-recess intersecting said overflow rim, and out-turned lips at the junction of said chalaza-recess.

6. In a device of the character described, a yolk support having a concaved floor and cut-down front wall as an albumen overflow rim, a chalaza-recess intersecting said overflow rim, and slotted back through the floor of the support toward its center and out-turned lips at the junction of said rim and recess.

7. In a device of the character described, a handle, a bowl carried thereby having a concaved floor, and a chalaza-recess in the edge of said bowl and cutting back through the floor of the bowl toward its center as a narrow slot whose edges are about parallel.

8. In a device of the character described, a yolk-support having a concaved floor, and a chalaza-recess in the rim of the support and cutting back through the floor of the support toward its center as a narrow slot whose edges are about parallel, said rim sloping at each side to the chalaza-recess.

9. In a device of the character described, a yolk-support having a concaved floor and an albumen overflow rim, and a chalaza-recess intersecting said overflow rim and cutting back through the floor of the support toward its center as a narrow slot whose edges are about parallel.

MARGUERITE POLCAR.

REFERENCES CITED

The following references are of record in the file of this patent:

UNITED STATES PATENTS

| Number | Name | Date |
|---|---|---|
| 251,719 | Knapp | Jan. 3, 1882 |
| 619,363 | Stevenson | Feb. 14, 1899 |
| 904,553 | McCoy | Nov. 24, 1908 |
| 1,001,314 | Shuey | Aug. 22, 1911 |

FOREIGN PATENTS

| Number | Country | Date |
|---|---|---|
| 378,936 | Germany | Jan. 17, 1922 |